United States Patent
Chiang et al.

(10) Patent No.: US 8,369,292 B2
(45) Date of Patent: Feb. 5, 2013

(54) METHOD AND APPARATUS FOR MOBILITY MANAGEMENT IN COMMUNICATION NETWORKS

(75) Inventors: Wei-Kuo Chiang, Min-Hsiung Chia-Yi (TW); Che-Shiun Ho, Taipei (TW); Chien-Chan Hsu, Taipei (TW)

(73) Assignee: Industrial Technology Research Institute (TW)

( * ) Notice: Subject to any disclaimer, the term of this patent is extended or adjusted under 35 U.S.C. 154(b) by 826 days.

(21) Appl. No.: 11/478,126

(22) Filed: Jun. 30, 2006

(65) Prior Publication Data

US 2008/0037481 A1    Feb. 14, 2008

(51) Int. Cl.
    *H04W 4/00*    (2009.01)
(52) U.S. Cl. .................................. 370/338; 455/436
(58) Field of Classification Search .................. 370/338;
                                    455/432.1–432.3, 433, 436
    See application file for complete search history.

(56) References Cited

U.S. PATENT DOCUMENTS

| | | | |
|---|---|---|---|
| 6,766,171 B2 | 7/2004 | Pan et al. | |
| 7,454,206 B1 * | 11/2008 | Phillips et al. | 455/435.1 |
| 2002/0099937 A1 * | 7/2002 | Tuomenoksa | 713/153 |
| 2004/0107238 A1 * | 6/2004 | Orton et al. | 709/200 |
| 2004/0185848 A1 * | 9/2004 | Phan-Anh et al. | 455/435.1 |
| 2005/0078636 A1 | 4/2005 | Zhang et al. | |
| 2005/0195767 A1 | 9/2005 | Rahman | |
| 2005/0270981 A1 * | 12/2005 | Shaheen et al. | 370/241 |
| 2006/0068762 A1 * | 3/2006 | Baldwin et al. | 455/412.1 |
| 2006/0120287 A1 * | 6/2006 | Foti et al. | 370/231 |
| 2006/0140150 A1 * | 6/2006 | Olvera-Hernandez et al. | 370/331 |
| 2006/0211423 A1 * | 9/2006 | Ejzak et al. | 455/445 |
| 2006/0256751 A1 * | 11/2006 | Jagadeesan et al. | 370/331 |
| 2008/0022391 A1 * | 1/2008 | Sax et al. | 726/15 |
| 2008/0119165 A1 * | 5/2008 | Mittal et al. | 455/411 |

FOREIGN PATENT DOCUMENTS

WO    WO 0207396 A1 *    1/2002

OTHER PUBLICATIONS

3GPP TS23.234 v6.1.0, "3GPP System to Wireless Local Area Network (WLAN) Interworking; System Description (Release 6)," Jun. 2004.
3GPP TS23.228 v6.9.0, "IP Multimedia Subsystem (IMS); Stage 2 (Release 6)," Mar. 2005.
Wang et al., "Design and evaluation of an integrated mobile IP and SIP Framework for Advanced Handoff Management," Communications, 2004 IEEE International Conference, Jun. 2004.
Wong et al., "Managing Simultaneous Mobility of IP Hosts," Military Communications Conference, 2003.
Rosenberg et al., "SIP: Session initiation protocol," IETF, RFC 3261, Jun. 2002.
Schulzrinne et al., "Application Layer Mobility Using SIP", Mobile Computing and Communications Review, vol. 4, No. 3, May 2001.
3GPP TS23.278 v5.6.0, "Customised Applications for Mobile Network Enhanced Logic (CAMEL) Phase 4—Stage 2 (Release 5)," Sep. 2004.

(Continued)

*Primary Examiner* — Marcos Batista
(74) *Attorney, Agent, or Firm* — Finnegan, Henderson, Farabow, Garrett & Dunner, LLP (57) ABSTRACT

A communication network for use in mobile communications may include at least one mobile device configured to communicate with a corresponding host through the communication network. The communication network may also include a packet data gateway configured to detect an attachment of the mobile device roaming into a wireless local area network controlled by the packet data gateway. Further, the communication network may include a mobility server coupled to the packet data gateway to establish a call session between the mobile device and the corresponding host.

20 Claims, 6 Drawing Sheets

OTHER PUBLICATIONS

Niemi, Ed. "Session Initiation Protocol (SIP) Extension for Event State Publication," IETF RFC 3903, Oct. 2004.

M. Georgiades et al., "AAA context transfer for seamless and secure multimedia services over ALL-IP networks", 5th European Wireless Conference (EW'04), Feb. 24-27, Barcelona, Spain.

A. Dutta et al., "Application Layer Mobility Management Scheme for Wireless Internet," IEEE 3GWireless01, San Francisco, CA, May 2001.

N. Nakajima et al., "Handoff Delay Analysis and Measurement for SIP Based Mobility in IPv6," Communications, 2003. ICC '03, IEEE, May 2003.

* cited by examiner

METHOD AND APPARATUS FOR MOBILITY MANAGEMENT IN COMMUNICATION NETWORKS

TECHNICAL FIELD

The present invention generally relates to the field of communication mobility management and, more particularly, to methods and systems providing network initiated real-time mobility management in mobile communication networks.

BACKGROUND

Modern mobile devices are often capable of communicating in both a wireless local area network (WLAN) environment and a third generation (3G) cellular telephone network environment. In a WLAN, the mobile devices can exchange data in various forms with each other using standard protocols, such as the IEEE 802.11b specification, etc. The mobile devices can also access other communication networks, such as the Internet, via the 3G cellular network over TCP/IP. A particular mobile device is usually assigned a home address (e.g., an IP address, etc.) by a home network, where the mobile device is originally registered, to be used in communication with other parties.

However, as the mobile device moves across different remote networks that are outside the home network, the different remote networks may assign different IP addresses to the mobile device. On the other hand, other parties communicating with the mobile device may still try to communicate with the mobile device based on the home address. Thus, the roaming mobile device may be unable to continue communicating with the other parties when moving across different remote networks. Techniques such as mobile internet protocol (MIP) attempt to manage the mobility of the mobile device by using a home agent and a foreign agent. The home agent receives all communications to the mobile device at the mobile device's original home IP address and forwards the received communications to the foreign agent in the remote networks across which the mobile device moves. The mobile device can then obtain the forwarded communications from the foreign agent.

However, because all communications must be received and forwarded by the home agent as a relay point, delays may occur in the communication between the mobile device and the other parties. Such delay may be large when the mobile device moves into a remote network having a long routing path to the home network. In addition, the delay may also be inconsistent due to different routing paths from the remote networks to the home network. Therefore, conventional techniques such as MIP may be undesirable for real-time applications, such as voice over IP (VoIP) applications.

Session initiation protocol (SIP) may also be used to manage mobility. SIP may manage real-time sessions directly from the mobile device by inviting other parties to start a session or sessions for communication. When the mobile device roams into a different remote network and detects a change of the IP address of the mobile device, the mobile device may re-invite other parties to start a different session or sessions to continue the communication with the changed IP address.

However, when using SIP, the mobile device often needs to determine, by frequent polling, whether its IP address has been changed. Less frequent polling may cause larger delays in re-inviting the other parties to use a different address. However, more frequent polling can increase the burden on the computational resources of the mobile device. Further, simultaneous mobility, when both communication parties are roaming, may often cause loss of established sessions or failure to establish new sessions using SIP.

Methods and systems consistent with certain features of the disclosed embodiments are directed to solving one or more of the problems set forth above.

SUMMARY OF THE INVENTION

One aspect of the present disclosure includes a communication network for use in mobile communications. The communication network may include at least one mobile device configured to communicate with a corresponding host through the communication network. The communication network may also include a packet data gateway configured to detect an attachment of the mobile device to a wireless local area network controlled by the packet data gateway when the mobile device roams into the wireless local area network. Further, the communication network may include a mobility server, coupled to the packet data gateway, for establishing a call session between the mobile device and the corresponding host.

Another aspect of the present disclosure includes method for use in performing mobile communications in a communication network. The method may include attaching to a wireless local area network controlled by a packet data gateway by a mobile device. The mobile device may be configured to communicate with a corresponding host through the communication network. The method may also include detecting the attachment of the mobile device by the packet data gateway and triggering a mobility server coupled to the packet data gateway by the packet data gateway. The method may also include establishing a call session between the mobile device and the corresponding host by the mobility server.

Another aspect of the present disclosure includes a mobility server for use in a communication network. A mobile device may communicate with a corresponding host through the communication network. The mobility server may include a processor and the processor may be configured to receive an SIP message from a packet data gateway indicative of an attachment of the mobile device to a wireless local area network controlled by the packet data gateway when the mobile device roams into the wireless local area network. The processor may also be configured to establish a call session between the mobile device and the corresponding host using a third party call control (3PCC) process.

Another aspect of the present disclosure includes a packet data gateway for use in a communication network. A mobile device may communicate with a corresponding host through the communication network. The packet data gateway may include a processor. Further the processor configured to monitor a state of the mobile device and to determine, by detecting a change of the state, an attachment of the mobile device to a wireless local area network controlled by the packet data gateway when the mobile device roams into the wireless local area network. Further, the processor may also be configured to notify the attachment to a mobility server.

DETAILED DESCRIPTION

Reference will now be made in detail to exemplary embodiments, which are illustrated in the accompanying drawings. Wherever possible, the same reference numbers will be used throughout the drawings to refer to the same or like parts.

To overcome problems set forth above and/or additional problems that may be discovered, a mobility server and/or an enhanced packet data gateway may be provided to implement certain features as disclosed or explained below, such as real time mobility management, etc. Certain details of the features consistent with the present invention will be described with references to the relevant drawings.

Figure 1:
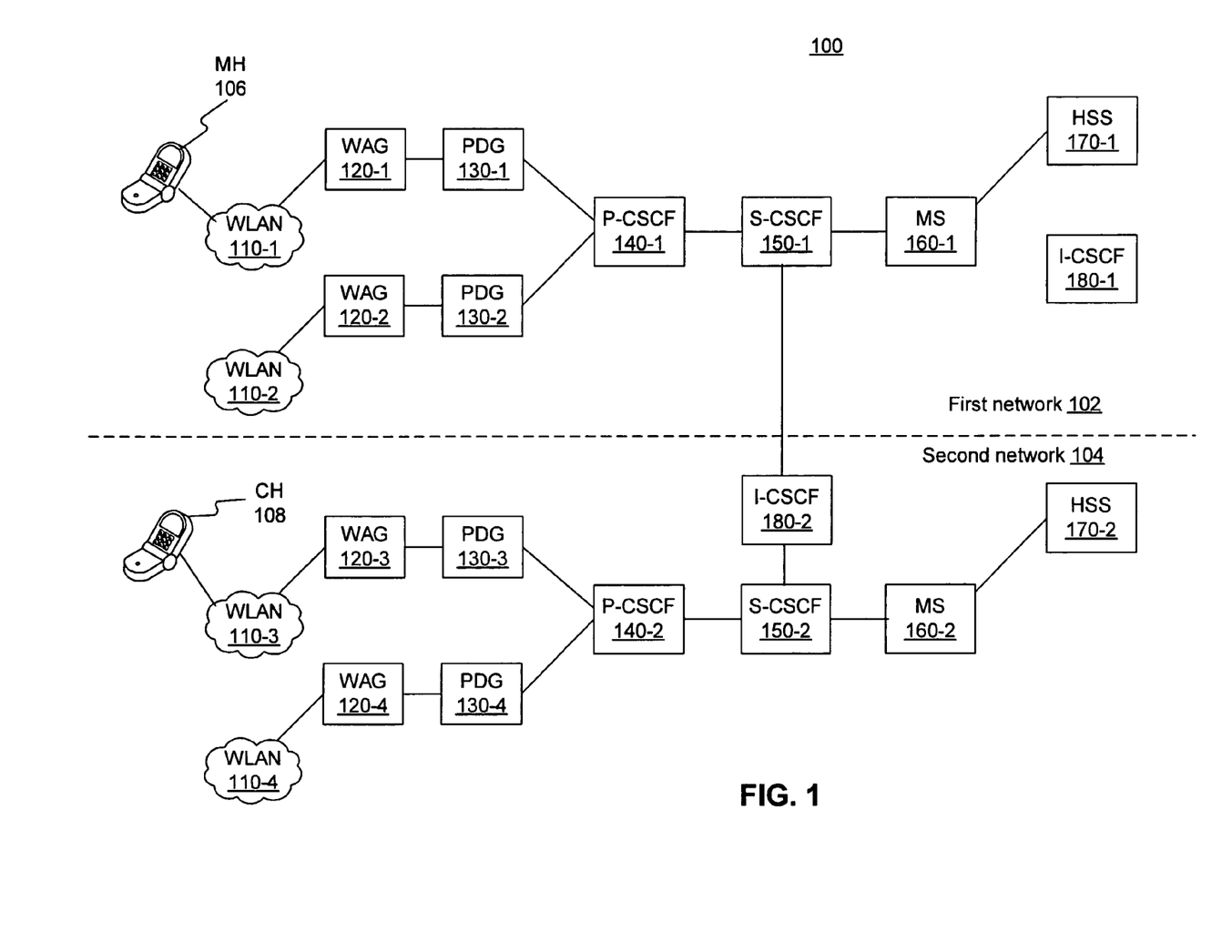
FIG. 1 illustrates an exemplary operational environment consistent with the present invention.

FIG. 1 shows an exemplary operational environment 100 having systems that incorporate certain embodiments of the present invention. Operational environment 100 may include a first network 102 and a second network 104. A mobile host (MH) 106 may be included or registered in first network 102. MH 106 may communicate with a correspondence host (CH) 108 that may be included or registered in second network 104. MH 106 and/or CH 108 may include any appropriate mobile device capable of accessing a WLAN and/or a cellular telephone network. For example, MH 106 and/or CH 108 may include a computer or computing device equipped with a wireless access device, or a cellular telephone device capable of voice and/or data communication.

First network 102 may include any appropriate type of communication network based on certain standards, such as WLAN, 3GPP, and CDMA-2000, etc. For example, first network 102 may include a wireless local area network (WLAN) 110-1, a WLAN access gateway (WAG) 120-1, a packet data gateway (PDG) 130-1, a proxy call session control function (P-CSCF) 140-1, a serving call session control function (S-CSCF) 150-1, a mobility server (MS) 160-1, a home subscriber server (HSS) 170-1, and an interrogating call session control function (I-CSCF) 180-1. First network 102 may also include a WLAN 110-2, a WAG 120-2, and a PDG 130-2. Any network device (e.g., WLAN 110-1, WAG 120-1, PDG 130-1, P-CSCF 140-1, S-CSCF 150-1, MS 160-1, HSS 170-1, I-CSCF 180-1, WLAN 110-2, WAG 120-2, and PDG 130-2, etc.) provided in first network 102 for serving MH 106 and/or controlling first network 102 may be referred to as a network element in first network 102.

MH 106 may access WLAN 110-1 for communicating with other communication devices inside or outside WLAN 110-1 and/or for obtaining certain packet switching based services via PDG 130-1 and WAG 120-1. MH 106 may be originally registered with WLAN 110-1 and/or PDG 130-1 to obtain a home address (e.g., an IP address, an identification number, etc.). Therefore, WLAN 110-1, WAG 120-1, and PDG 130-1 may be referred to as a 3GPP home network for MH 106. MH 106 may access any network, home network or otherwise, by attaching to the network. Attachment may refer to a series of operations performed by MH 106 to request access, such as obtaining certain control information of the network to be accessed and sending an access request to the network, etc.

The packet switching based services provided to MH 106 via PDG 130-1 or PDG 130-2 may include IP multimedia subsystem (IMS) services, such as voice over IP (VoIP) services, and/or presence based services, etc. Such IMS services may be provided by IP multimedia subsystems using certain communication standards to support mobile devices for multimedia services based on Internet applications, services, and/or protocols. For example, an IMS may use a 3GPP standard or a customized applications for mobile network enhanced logic (CAMEL) standard, etc. The IMS using such standards may include various network elements, such as proxy call session control function (P-CSCF), serving call session control function (S-CSCF), interrogating call session control function (I-CSCF), mobility server (MS), and/or home subscriber server (HSS), etc. For example, P-CSCF 140-1, S-CSCF 150-1, MS 160-1, I-CSCF 180-1, and HSS 170-1 may comprise an IMS and may be referred to as an IMS with respect to MH 106 in first network 102. Other types of IMS, however, may also be used.

MH 106 may temporarily roam into a remote network or a visited network. That is, MH 106 may move out of the network coverage of WLAN 110-1 and may enter into the network coverage of the remote network (e.g., WLAN 110-2) and may continue communicating with other communication devices through the remote network. For example, MH 106 may roam into WLAN 110-2 and may continue communicating with the other communication devices and/or accessing the packet switching based services via PDG 130-2 and WAG 120-2. That is, MH 106 may roam into WLAN 110-2 without a substantial interruption of network service and WLAN 110-2, WAG 120-2, and PDG 130-2 may be referred to as a 3GPP visited network for MH 106.

Further, second network 104 may include a WLAN 110-3, a WAG 120-3, a PDG 130-3, a P-CSCF 140-2, an S-CSCF 150-2, an MS 160-2, an HSS 170-2, and an I-CSCF 180-2. Second network 104 may also include a WLAN 110-4, a WAG 120-4, and a PDG 130-4 for providing access to CH 108. CH 108 may attach to WLAN 110-3 or WLAN 110-4 to communicate with other communication devices (e.g., MH 106, etc.) and to access other services (e.g., IMS services, etc.). WLAN 110-3, WAG 120-3, and PDG 130-3 may be referred to as a 3GPP home network for CH 108; and WLAN 110-4, WAG 120-4, and PDG 130-4 may be referred to as a 3GPP visited network for CH 108. In addition, P-CSCF 140-2, S-CSCF 150-2, MS 160-2, I-CSCF 180-2, and HSS 170-2 may also be referred to as an IMS with respect to CH 108 in second network 104 based on, for example, a 3GPP standard. Other types of communication networks, however, may also be used. Further, communication paths among various elements shown in FIG. 1 are illustrative only, different communication paths may be established to enable communications among the various elements directly or indirectly. For example, PDG 130-1 and PDG 130-2 may communicate with MS 160-1 directly.

As explained, WLANs 110-1 to 110-4 may provide access to mobile devices such as MH 106 or CH 108. A WLAN (e.g., WLANs 110-1 to 110-4) may include any appropriate type of wireless local area network and/or other network devices. For example, the WLAN may include an access network with radio equipment (not shown) for accessing the WLAN; an authentication, authorization, and accounting (AAA) server and/or proxy for user management (not shown), and a WLAN access controller (WAC) for controlling access to the WLAN (not shown).

WAGs 120-1 to 120-4 may provide certain gateway functions for associated WLANs. A WAG (e.g., WAGs 120-1 to 120-4) may include any appropriate type of network component or device acting as a gateway for accessing the WLAN. For example, the WAG may control routing of data packets from a mobile device (e.g., MH 106, etc.) to a corresponding PDG and/or providing filter policy to filter out illegitimate data packets to and/or from the WLAN. Other functionalities may also be provided on the WAG.

PDGs 130-1 to 130-4 may provide certain packet switching functions and/or packet switching network gateway functions. A PDG (e.g., PDGs 130-1 to 130-4) may include any appropriate type of network component providing gateway functions for packet based services to allow the mobile device to access such services provided by a packet data network (PDN). For example, the PDG may provide gateway functions such as packet filtering, packet encapsulation, packet de-encapsulation, address translation, address mapping, and/or packet tunneling such as end-to-end tunneling, etc. The packet data network may include any appropriate type of network capable of communicating data packets, such as IP multimedia subsystems in 3GPP networks, and/or the Internet (not shown). Through the PDG, the mobile device may communicate with other mobile devices in 3GPP networks and/or non-mobile devices on the Internet and/or other computer or cellular networks based on, for example, TCP/IP standard.

The MH 106's IMS (e.g., P-CSCF 140-1, S-CSCF 150-1, MS 160-1, I-CSCF 180-1, and HSS 170-1, etc.) and the CH 108's IMS (e.g., P-CSCF 140-2, S-CSCF 150-2, MS 160-2, HSS 170-2, and I-CSCF 180-2, etc.) may provide packet switching based services or multimedia services between MH 106 and CH 108 through PDGs 130-1 to 130-4. A P-CSCF (e.g., P-CSCF 140-1 and P-CSCF 140-2, etc.) may provide proxy call session control functions for mobile devices.

P-CSCF 140-1 and P-CSCF 140-2 may include any appropriate systems providing proxy call session control functions. For example, P-CSCF 140-1 and P-CSCF 140-2 may locate a mobile device's local network. P-CSCF 140-1 and P-CSCF 140-2 may also find a related I-CSCF in the mobile device's home network and may forward the registration information to the related I-CSCF to complete a registration process. P-CSCF 140-1 and P-CSCF 140-2 may also provide call setup services to mobile devices. For example, P-CSCF 140-1 and P-CSCF 140-2 may use session initiation protocol (SIP) to participate in setting up call sessions for the mobile device.

S-CSCF 150-1 and S-CSCF 150-2 may include any appropriate systems providing serving call session control functions. For example, S-CSCF 150-1 and S-CSCF 150-2 may include systems providing mobile device registration and/or call session control functions, etc. S-CSCF 150-1 and S-CSCF 150-2 may receive the registration information forwarded by P-CSCF 140-1 and P-CSCF 140-2, respectively, and may send the registration information to a home subscriber server (e.g., HSS 170-1 and HSS 170-2, etc.). S-CSCF 150-1 and S-CSCF 150-2 may also use SIP to control call sessions for the mobile devices.

Further, HSS 170-1 and HSS 170-2 may include any appropriate systems providing various database functions related to mobile subscribers, such as home location register (HLR), subscriber registration databases, domain name service (DNS), and/or security and network access databases. HSS 170-1 and HSS 170-2 may authorize access of mobile devices such as MH 106 and CH 108. HSS 170-1 and HSS 170-2 may also accept queries from I-CSCF 180-1 and I-CSCF 180-2, respectively, and/or other network elements, to find proper serving call session control functions (S-CSCFs) for mobile devices. I-CSCF 180-1 and I-CSCF 180-2, on the other hand, may include any appropriate systems providing such query functions and/or signaling services for call session management.

As explained above, an IMS may use SIP to manage call sessions between mobile devices or between a mobile device and a landline or non-mobile device, such as a landline telephone hand-set and/or a desktop computer, etc. The IMS may also use SIP among various network elements (e.g., P-CSCF 140-1, S-CSCF 150-1, MS 160-1, and I-CSCF 180-1, etc.) to set up call sessions for the mobile device.

In certain embodiments, MS 160-1 and MS 160-2 may be provided to coordinate call session control and, more particularly, mobility management for the mobile device. MS 160-1 and MS 160-2 may include any appropriate systems providing mobility management. The mobility management may include any appropriate type of mobility, such as terminal mobility management, session mobility management, etc.

Figure 2:
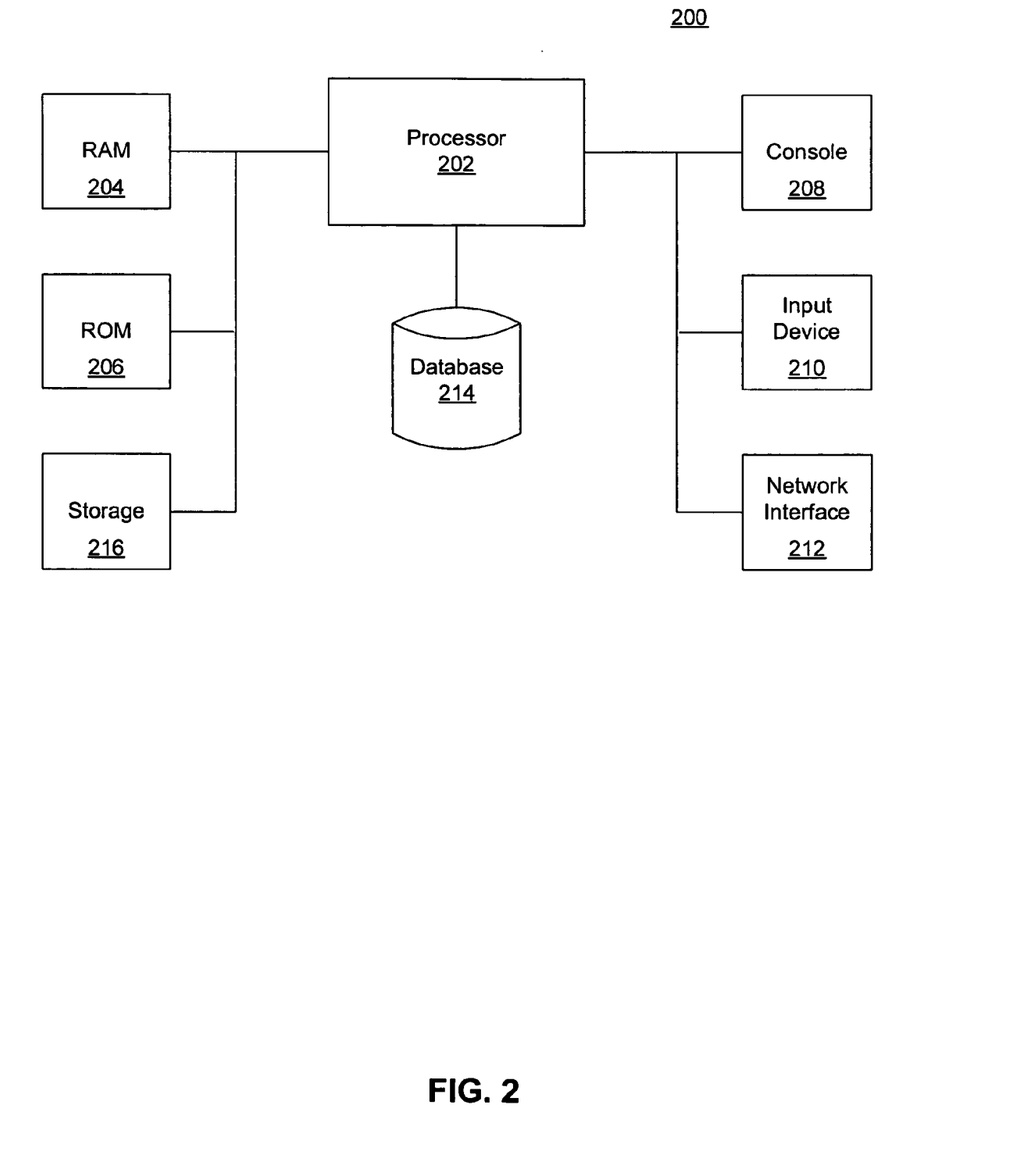
FIG. 2 illustrates a functional block diagram of an exemplary computer system 200 consistent with the present invention.

The various network elements in first network 102 and second network 104, such as MSs, PDGs, CSCFs, etc., may be implemented in any appropriate means. For example, the network elements may be implemented by computer hardware, computer software, and/or a combination of hardware and software. In certain embodiments, the various network elements may be implemented in a computer system with proper configurations. FIG. 2 shows a functional block diagram of an exemplary computer system 200 that may be configured separately as the various network elements. In addition, computer system 200 may also be configured as a computer platform to develop and implement the computer software applications provided to the network elements.

As shown in FIG. 2, computer system 200 may include a processor 202, a random access memory (RAM) 204, a read-only memory (ROM) 206, a console 208, an input device 210, a network interface 212, a database 214, and a storage 216. It is understood that the type and number of listed devices are exemplary only and not intended to be limiting. The number of listed devices may be changed and other devices may be added.

Processor 202 may include any appropriate type of general purpose microprocessor, digital signal processor, or microcontroller. Processor 202 may execute sequences of computer program instructions to perform various functions as explained above. Processor 202 may be coupled to or access other devices, such as RAM 204, ROM 206, console 208, input device 210, network interface 212, database 214, and/or storage 216, to complete executions of computer program instructions.

The computer program instructions may be loaded into RAM 204 from read-only memory (ROM) 206, or from storage 216, for execution by processor 202. Storage 216 may include any appropriate type of mass storage provided to store any type of information that processor 202 may need. For example, storage 216 may include one or more hard disk devices, optical disk devices, or other storage devices to provide storage space.

Console 208 may provide a graphic user interface (GUI) or other user interfaces to display information to users of computer system 200. Console 208 may include any appropriate type of computer display device or computer monitor. Input device 210 may be provided for users to input information into computer system 200. Input device 210 may include a keyboard, a mouse, or other optical or wireless computer input device, etc.

Further, network interface 212 may provide communication connections such that computer system 200 may be accessed remotely through various networks. Database 214 may contain any information used by processor 202. Database 214 may include any type of commercial or customized database. Database 214 may also include analysis tools for analyzing the information in the database.

Figure 3:
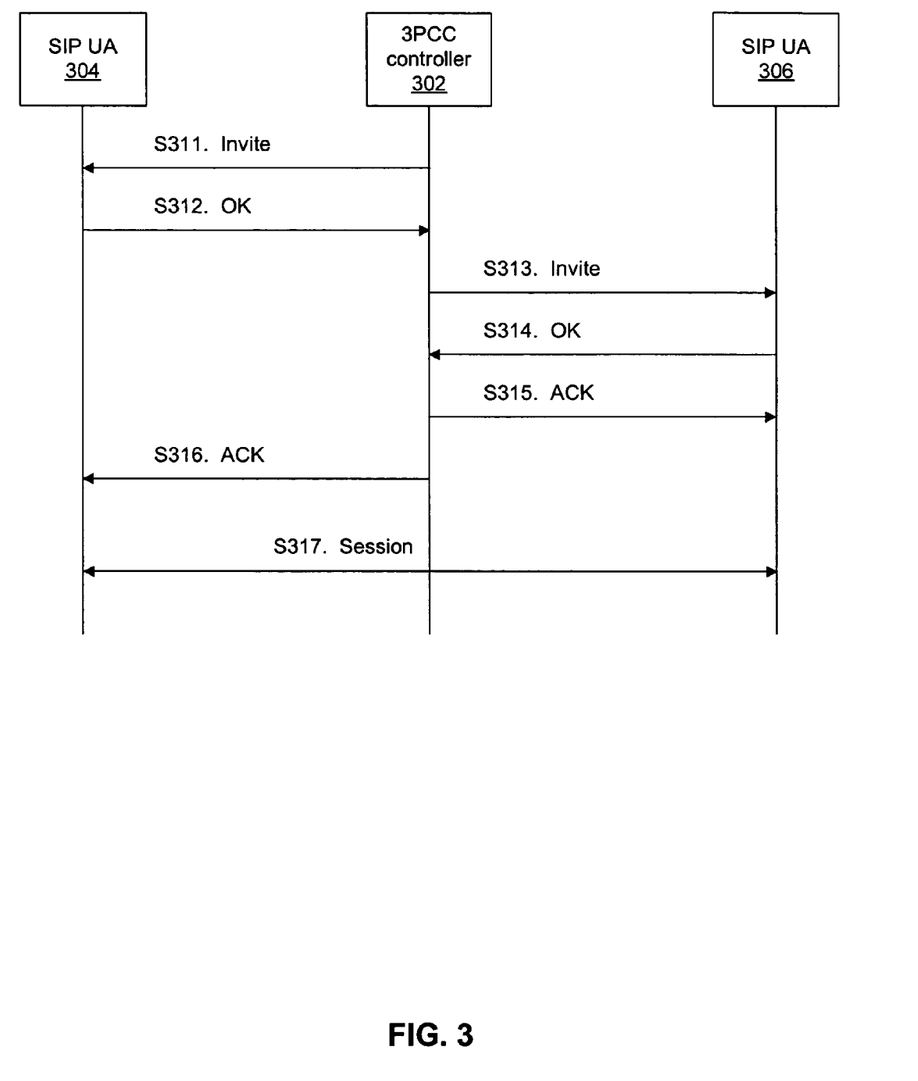
FIG. 3 illustrates an exemplary SIP session setup process consistent with the present invention.

Processor 202 may execute certain software programs to carry out corresponding functions of the various network elements. For example, MS 160-1 and MS 160-2 may execute certain software applications to facilitate re-establishing previous sessions or establishing new sessions for mobile devices (e.g., MH 106 and CH 108, etc.) when the mobile devices roam from one WLAN to another. Re-establishing previous sessions may include establishing new sessions that have certain continuation relationships with the previous sessions. More specifically, when SIP is used by MS 160-1 and MS 160-2, MS 160-1 and MS 160-2 may use techniques such as third party call control (3PCC) to control SIP operations and call sessions for mobility management. FIG. 3 shows an exemplary SIP session setup process between SIP user agents (UAs).

As shown in FIG. 3, a 3PCC controller 302 may be provided on a mobility server (e.g., MS 160-1 and MS 160-2). The 3PCC controller 302 may be provided to establish a SIP session between a SIP UA 304 and a SIP UA 306 using a third party call control technique. Third party call control may refer to the ability of one entity to create a call for communication actually between other parties such as SIP user agents. A SIP UA (e.g., SIP UA 304, SIP UA 306, etc.) may refer to a particular software program or programs executed on any mobile device or network element to perform certain SIP operations, such as call session establishment or re-establishment. For illustrative purposes, a SIP UA may also refer to the device or network element where the software program is executed. For example, SIP UA 304 and/or SIP UA 306 may also represent mobile hosts (e.g., MH 106, CH 108, etc.) using SIP to set up call sessions.

The 3PCC controller 302 may decide that a call session is to be established between SIP UA 304 and SIP UA 306. At the beginning of the call session setup process, 3PCC controller 302 (e.g., MS 160-1 or MS 160-2, etc.) may send a SIP "Invite" message to SIP UA 304 (step S311). The SIP "Invite" message may include various data fields containing SIP session relevant information. In certain embodiments, the SIP "Invite" message may be sent without session description protocol (SDP) information.

SIP UA 304 may receive the SIP "Invite" message from 3PCC controller 302, and may decide to accept the call session. SIP UA 304 may then send back a SIP "OK" message back to 3PCC controller 302 to indicate that SIP UA 304 is ready to accept a call (step S312). In certain embodiments, the SIP "OK" message may include an offer of SDP. Further, the SIP "OK" message may also include call session information offered by SIP UA 304 to establish the call session.

After receiving the SIP "OK" message from SIP UA 304, 3PCC controller 302 may send a second SIP "Invite" message to SIP UA 306 (step S313). The second SIP "Invite" message may also include the call session information offered by SIP UA 304, such as the offer of SDP. Other information, however, may also be included. SIP UA 306 may, after receiving the SIP "Invite" message, decide to accept the call session and may send back a SIP "OK" message to 3PCC controller 302 (step S314). The SIP "OK" message may include an answer of SDP. The answer of SDP in the SIP "OK" message may include information answered and/or agreed by SIP UA 306 in response to call session information offered by SIP UA 304. After receiving the SIP "OK" message from SIP UA 306, 3PCC controller 302 may acknowledge the receipt of the SIP "OK" message to SIP UA 306 by sending a SIP "ACK" message to SIP UA 306 (step S315).

Further, 3PCC controller 302 may also send a second SIP "ACK" message to SIP UA 304 to acknowledge the response "ACK" message from SIP UA 306 (step S316). This second SIP "ACK" message may include information answered by SIP UA 306 in response to the call session information offered by SIP UA 304. After both SIP UA 304 and SIP UA 306 obtain information from 3PCC controller 302 on the call session and other parameters, such as addresses, protocols, capacities, etc., SIP UA 304 and SIP UA 306 may establish the call session to directly exchange call information with each other (step 317). As used herein, call session may also include media session when used in an IMS.

Figure 4:
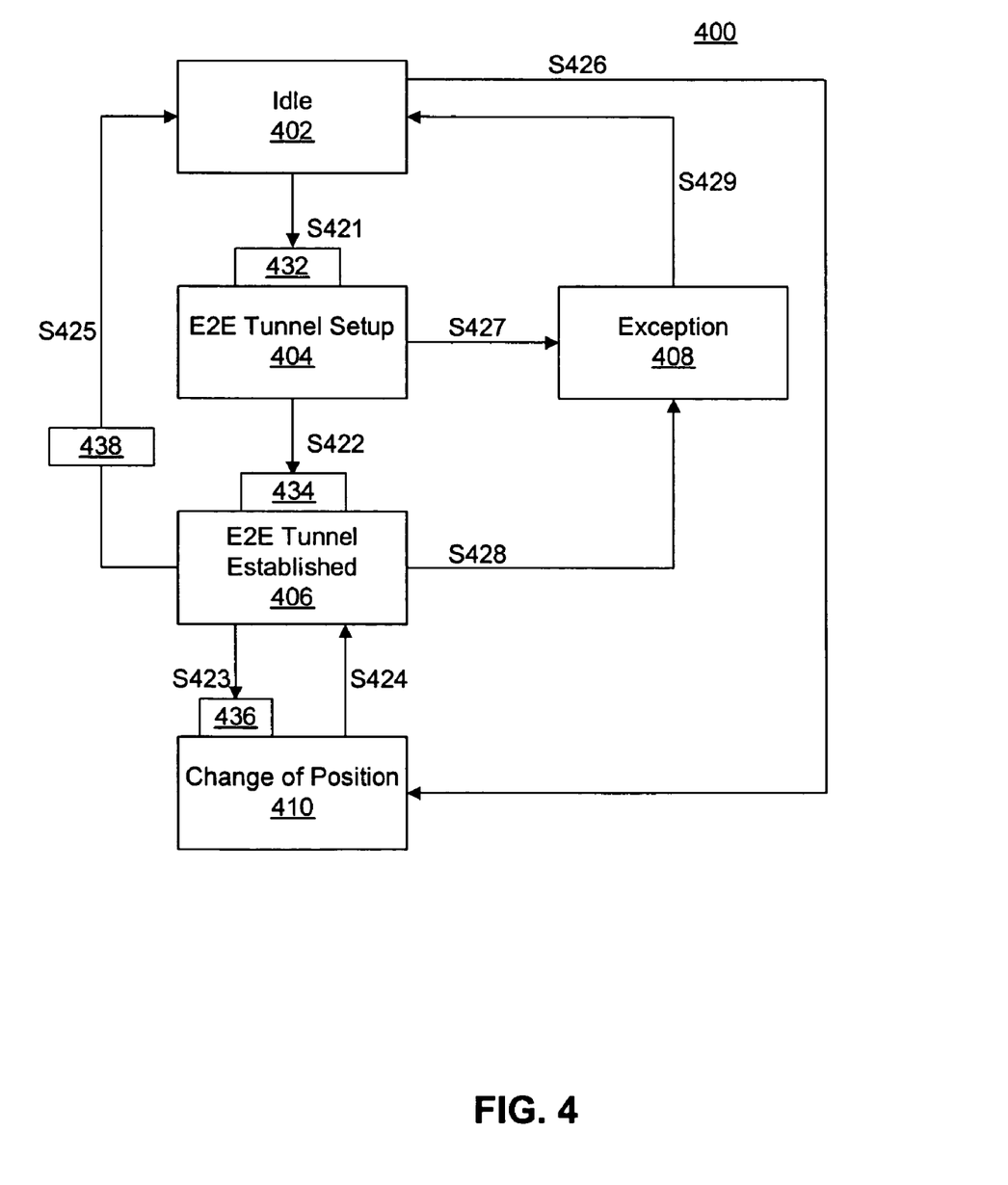
FIG. 4 illustrates an exemplary state model consistent with the present invention.

When using 3PCC to set up call sessions between MH 106 and CH 108, MS 160-1 and/or MS 160-2 may need information on the mobility of MH 106 and CH 108. That is, MS 160-1 and/or MS 160-2 may be notified when MH 106 or CH 108 roam into a different WLAN. MS 160-1 and/or MS 160-2 may obtain such mobility information from various sources, such as PDGs, P-CSCFs, S-CSCFs, MH 106, CH 108, and/or I-CSCFs, etc. In certain embodiments, packet data gateways (e.g., PDGs 130-1 to 130-4, etc.) may be used to detect the mobility of MH 106 and/or CH 108. For example, PDG 130-1 and PDG 130-2 may include certain software programs that monitor status of states of tunnels established between a PDG and a mobile device for mobility management. FIG. 4 shows an exemplary state model 400 of a tunnel between a particular mobile device and a PDG (e.g., PDG 130-1 or PDG 130-2, etc.) and, more specifically, processor 202 of the PDG.

As shown in FIG. 4, processor 202 of the PDG may determine and monitor a state of an end-to-end (E2E) tunnel established between a mobile device (e.g., MH 106 or CH 108, etc.) and the PDG. An E2E tunnel may refer to a logic communication channel between the mobile device and the PDG over which the mobile device and the PDG can exchange data related to a call session or sessions between the mobile device and another corresponding mobile device in certain encapsulated forms. The state of an E2E tunnel may refer to a certain stage of the E2E tunnel or E2E tunnel operations, such as establishment, during the existence of the E2E tunnel related to the mobile device. State model 400 may include different states, such as "Idle" 402, "E2E tunnel setup" 404, "E2E tunnel established" 406, "Exception" 408, and "Change of position" 410, etc. Other states, however, may also be used. State model 400 may also include transitions among different states based on certain events or actions associated with the mobile device.

Further, state model 400 may also include various detection points, such as an E2E tunnel establishment detection points 432, an E2E tunnel acknowledgement detection point 434, an E2E tunnel change of position detection point 436, and an E2E tunnel disconnection detection point 438. Although four detection points are illustrated in FIG. 4, any number of detection points may be provided. As used herein, a detection point may refer to a predetermined stage during the state transitions of the E2E tunnel where processor 202 may perform certain actions. In certain embodiments, the actions may be conditional upon a set of trigger conditions. Processor 202 may detect whether any of the set of trigger conditions are satisfied and, if one or more conditions are satisfied, processor 202 may further perform actions corresponding to the one or more conditions.

Further, the trigger conditions and actions may be set by any network element and/or by a mobile device or a user of the mobile device. The user of the mobile device may register such trigger conditions and associated actions with the PDG with respect to a particular detection point, and the PDG may, at the particular detection point, determine whether any trigger condition is satisfied and perform the associated action if the trigger condition is satisfied. For example, PDG may forward data from the mobile device to a relevant service provider in certain conditions if the mobile device registers with the PDG on a detection point for such forwarding action.

MH 106 may communicate with CH 108 using one or more call sessions. A call session may be supported by the PDG via one or more E2E tunnels; and an E2E tunnel may support one or more sessions. Before an E2E tunnel is setup or after the E2E tunnel is disconnected or not in use for a certain amount of time, processor 202 may assign the state of "Idle" 402 to the E2E tunnel. While the state is "Idle" 402, if processor 202 receives a request for establishing a call session supported by an E2E tunnel (e.g., attachment to a WLAN, etc.), processor 202 may try to establish the end-to-end (E2E) tunnel with a corresponding mobile device, such as MH106 or CH 108, based on the request (step S421). Processor 202 may also change the state to "E2E tunnel setup" 404. Further, processor 202 may also determine whether any trigger condition registered with E2E tunnel establishment detection point 432 is satisfied. If the trigger condition is satisfied, processor 202 may perform a predetermined action or an registered action associated with the satisfied condition.

While the state of the E2E tunnel is in the state of "E2E tunnel setup" 404, processor 202 may send an E2E tunnel setup acknowledge message to the corresponding mobile device (step S422) and may also update the state of the E2E tunnel to "E2E tunnel established" 406. Processor 202 may also determine whether any trigger condition registered with E2E tunnel acknowledgement detection point 434 is satisfied. If the trigger condition is satisfied, processor 202 may perform a predetermined action or an registered action associated with the satisfied condition.

On the other hand, if processor 202 determines that E2E tunnel establishment fails for certain reasons (step S427), processor 202 may update the state of the E2E tunnel to "Exception" 408. Processor 202 may also update the state of the E2E tunnel back to "Idle" 402 from "Exception" 408 in certain situations, such as a time out event, an alarm clearing event, etc. (step S429).

While the state of the E2E tunnel is in the state of "E2E tunnel established" 406, processor 202 may determine certain operational failures (step S428) and may also update the state of the E2E tunnel to "Exception" 408. Processor 202 may also receive a disconnection request from the mobile device or from a network element (step S425), and may disconnect the E2E tunnel based on the request and update the state to "Idle" 402. Processor 202 may also determine whether any trigger condition registered with E2E tunnel disconnection detection point 438 is satisfied. If the trigger condition is satisfied, processor 202 may perform a predetermined action or an registered action associated with the satisfied condition.

Further, while the state of the E2E tunnel is in the state of "E2E tunnel established" 406, processor 202 may receive a dynamic area update message from the mobile device and/or from certain network elements (step S423). Based on the dynamic area update message, processor 202 may decide that the mobile device has roamed in or out of the coverage of the PDG of processor 202. Processor 202 may update the state of the E2E tunnel to "Change of position" 410.

Processor 202 may also perform certain operations in response to the dynamic area update request message, such as notifying the mobility of the mobile device to one or more network elements, clearing or updating call session contexts, etc. Further, processor 202 may also determine whether any trigger condition registered with E2E tunnel change of position detection point 436 is satisfied. If the trigger condition is satisfied, processor 202 may perform a predetermined action or an registered action associated with the satisfied condition.

Further, if processor 202 receives the dynamic area update request message while the state of the E2E tunnel is in the state of "Idle" 402, processor 202 may also update the state of the E2E tunnel to "Change of position" 410 (step S426). Processor 202 may perform certain operations in response to the dynamic area update request message during the state of "Idle" 402. For example, processor 202 may receive a request from a mobile device just roaming into the WLAN controlled by the PDG of processor 202 and the mobile device may have a call session established through a previous PDG. That is, the PDG of processor 202 may receive an inter-PDG mobility request from the mobile device trying to attach to a WLAN. This request may also include direct interactions between the mobile device and the PDG, such as establishing an E2E tunnel.

Figure 5:
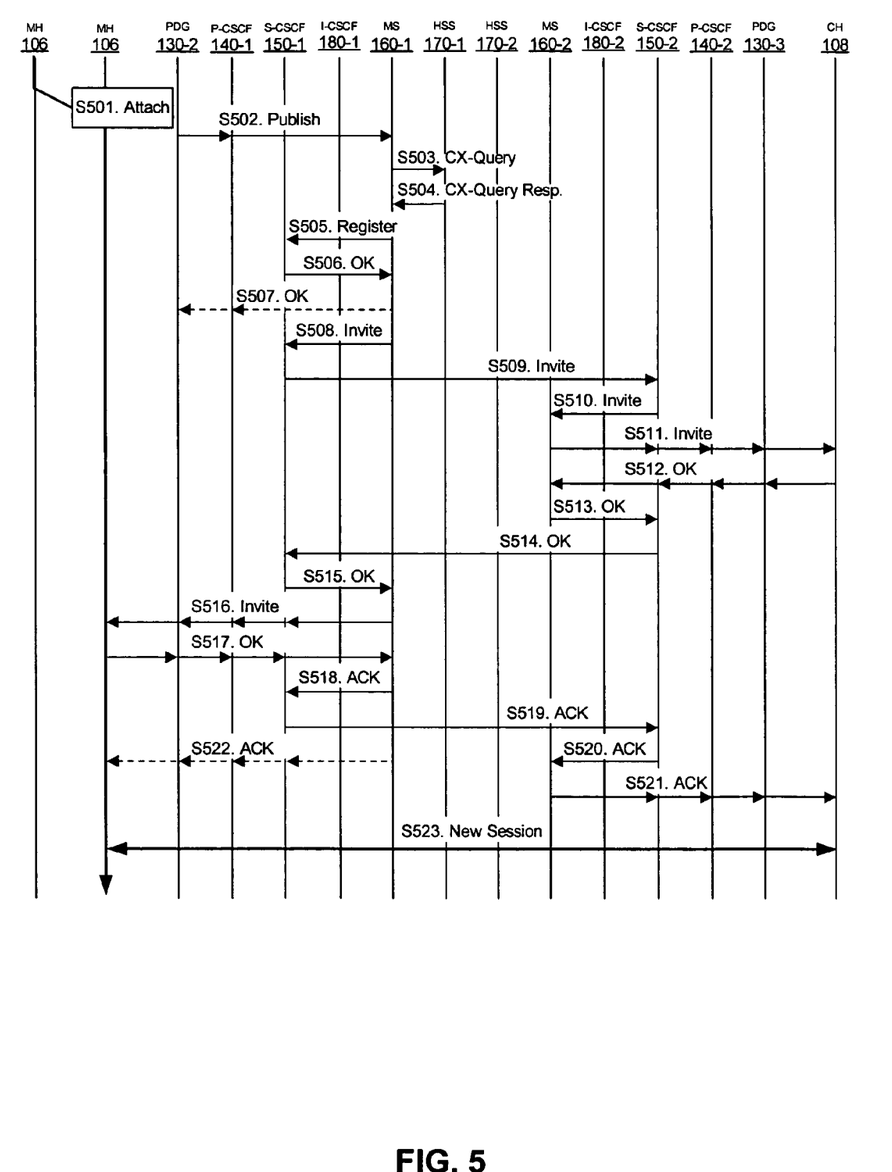
FIG. 5 illustrates an exemplary sequence diagram of an establishment/re-establishment process consistent with the present invention.

After performing certain operations associated with the state of "Change of position" 410, processor 202 may change the state of the E2E tunnel from "Change of position" 410 to "E2E tunnel established" 406 (step 424). FIG. 5 shows an exemplary sequence diagram of an establishment/re-establishment process involving various network elements.

As shown in FIG. 5, and also with reference to FIG. 1, MH 106 may communicate with CH 108 over an established call session via WLAN 110-1. MH 106 may move out of WLAN 110-1 and roam into WLAN 110-2. After roaming into WLAN 110-2, MH 106 may try to attach to WLAN 110-2 and to establish an E2E tunnel with PDG 130-2 to continue communicating with CH 108 (step S501). PDG 130-2 may receive indication of such attachment or request, such as shown in the state model explained above. For example, PDG 130-2 may determine an attachment of MH 106 by detecting a change of state of the E2E tunnel from "Idle" 402 to "Change of position" 410 and to "E2E tunnel established" 406. E2E tunnel change of position detection point may be used to trigger PDG 130-2 to perform certain operations in response to the attachment request.

With the attachment of MH 106, during tunnel establishment from MH 106 to PDG 130-2, after allocating a remote IP address to MH 106, PDG 130-2 may compose and send a SIP publish message to MS 160-1 to inform the mobility state of MH 106 (step S502). The SIP publish message may include information on the latest location of MH 106, a public user ID, a private user ID, and a home network domain name, etc. PDG 130-2 may send the publish message to MS 160-1 directly or through P-CSCF 140-1. An exemplary publish message may include the followings presented in an extensible markup language (XML):

PUBLISH MH1_public1@ms.home1.net SIP/2.0
Via: SIP/2.0/UDP
[5555::aaa:bbb:ccc:ddd]:1357;comp=sigcomp;branch=z9hG4bKnashds7
From: MH1_public1@PDG1.home2.net>;tag=31415
To: MH1_public1@ms.home1.net
Call-ID: b89rjhnedlrfjflslj40a222
CSeq: 61 PUBLISH
Event: presence
Expires: 7200
Content-Type: application/pidf+xml
Content-Length: (...)
<?xml version="1.0" encoding="UTF-8"?>
　　<presence xmlns="urn:ietf:params:xml:ns:pidf"
　　　　xmlns:ms="http://ms.home1.net/presence/"
　　　　entity="pres:MH1_public1@PDG1.home2.net">

```
<tuple id="a8098a.672364762364">
    <status>
        <basic>open</basic>
                <ms:Mobility>yes</ms:Mobility>
    </status>
    <ms:PubID>MH1_public1@SIP1.home1.net</ms:PubID>
    <ms:PivID>284011234567890</ms:PivID>
    <ms:HNDN>wlan.mnc123.mcc456.home1.net</ms:HNDN>
    <ms:RoA>123.111.122.133</ms:RoA>
</tuple>
</presence>
```

After receiving the publish message, MS 160-1 may send a CX-Query message to HSS 170-1 based on the information from the publish message to obtain subscriber information of MH 106 from HSS 170-1 (step S503). A CX-Query message may include inquiries on subscriber information about MH 106, such as home domain name, subscriber information, whether MH 106 is allowed to register in this IMS network, etc. HSS 170-1 may search subscriber databases and/or other databases to obtain information required by the CX-Query message. HSS 170-1 may reply to MS 160-1 by sending a CX-Query response message to MS 160-1 (Step S504).

MS 160-1 may, after receiving the CX-Query response message from HSS 170-1, register MH 106 with S-CSCF 150-1 such that S-CSCF 150-1 may provide various services needed for MH 106 (step S505). MS 160-1 may register MH 106 with S-CSCF 150-1 by sending a registration message to S-CSCF 150-1. Further, after receiving the registration message from MS 160-1, S-CSCF 150-1 may perform certain operations, such as updating its records to add MH 106, etc., and may send back an acknowledge message to MS 160-1 to indicate that the registration is complete and the S-CSCF 150-1 is ready to serve MH 106 (step S506).

MS 160-1 may also send back acknowledge messages to PDG 130-2 through P-CSCF 140-1 to indicate the completion of the registration and the publication (step S507). By receiving the acknowledge message from S-CSCF 150-1 to indicate the completion of the registration for MH 106 (step S506), MS 160-1 may determine that the network (e.g., the MH 106's IMS, the CH 108's IMS, etc.) is ready to serve MH 106 and may start the process for establishing a new call session between MH 106 and CH 108 or for re-establishing the call session between MH 106 and CH 108. MS 160-1 may start the establishment/re-establishment process using a 3PCC technique as explained above. Other techniques or processes, however, may also be used.

A sequence of SIP messages may be exchanged among various network elements and mobile devices to establish the call session. Mobility servers (e.g., MS 160-1, MS 160-2, etc.) may act as central data points (e.g., a 3PCC controller) for coordinating such message exchanges. For example, MS 160-1 may establish a call session with CH 108 by sending a SIP "Invite" message through the IMS network. First, MS 106 may send a SIP "invite" message to S-CSCF 150-1 (step S508). After receiving the SIP "Invite" message from MS 160-1, S-CSCF 150-1 may forward the SIP "Invite" message to corresponding S-CSCF 150-2 to request for the call session establishment (step S509). S-CSCF 150-2 may in turn forward the SIP "Invite" message to MS 160-2 to request for the call session establishment (step S510).

After receiving the SIP "Invite" message from S-CSCF 150-2, MS 160-2 may forward the SIP "Invite" message to CH 108 to request for a call session establishment with MH 106 (step S511). MS 160-2 may send the SIP "Invite" message to CH 108 through various network elements, such as S-CSCF 150-2, P-CSCF 140-2, PDG 130-3, etc. Further, CH 108 may accept the call establishment request by sending back a SIP "OK" message to MS 160-2, through, for example, S-CSCF 150-2, P-CSCF 140-2, PDG 130-3, etc. (step S512).

Accordingly, MS 160-2 may send a SIP "OK" message back to S-CSCF 150-2 (step S513), which may in turn forward the SIP "OK" message back to S-CSCF 150-1 (step S514). Further, S-CSCF 150-1 may forward the SIP "OK" message back to MS 160-1 to indicate that the call establishment has been accepted by CH 108(step S515).

Further, after receiving the SIP "OK" message from S-CSCF 150-1, MS 160-1 may send another SIP "Invite" message to MH 106 for establishing the call session between MH 106 and CH 108 (step S516). MH 106 may accept the request for establishing the call session and may send back a SIP "OK" message to MS 160-1 (step S517). MS 160-1 may determine that MH 106 and CH 108 are ready for the call session establishment/re-establishment and may send a SIP "ACK" message to CH 108 via, for example, S-CSCF 150-1 to confirm or acknowledge the setup completion (step S518). Further, S-CSCF 150-1 may forward the SIP "ACK" message to S-CSCF 150-2 (step S519), which may in turn forward the SIP "ACK" message to MS 160-2 (step S520).

MS 160-2 may also forward the SIP "ACK" message to CH 108 via, for example, S-CSCF 150-2, P-CSCF 140-2, PDG 130-3, etc. (step S521). MS 160-1 may also send a SIP "ACK" message to MH 106 via, for example, S-CSCF 150-1, P-CSCF 140-1, PDG 130-2, etc. (step S522). MH 106 and CH 108 may then start the established call session to continue the communication after MH 106 roamed into WLAN 110-2 from WLAN 110-1 (step S523). Thus, MH 106 and CH 108 may timely re-establish the previous call session during this operational process.

Figure 6:
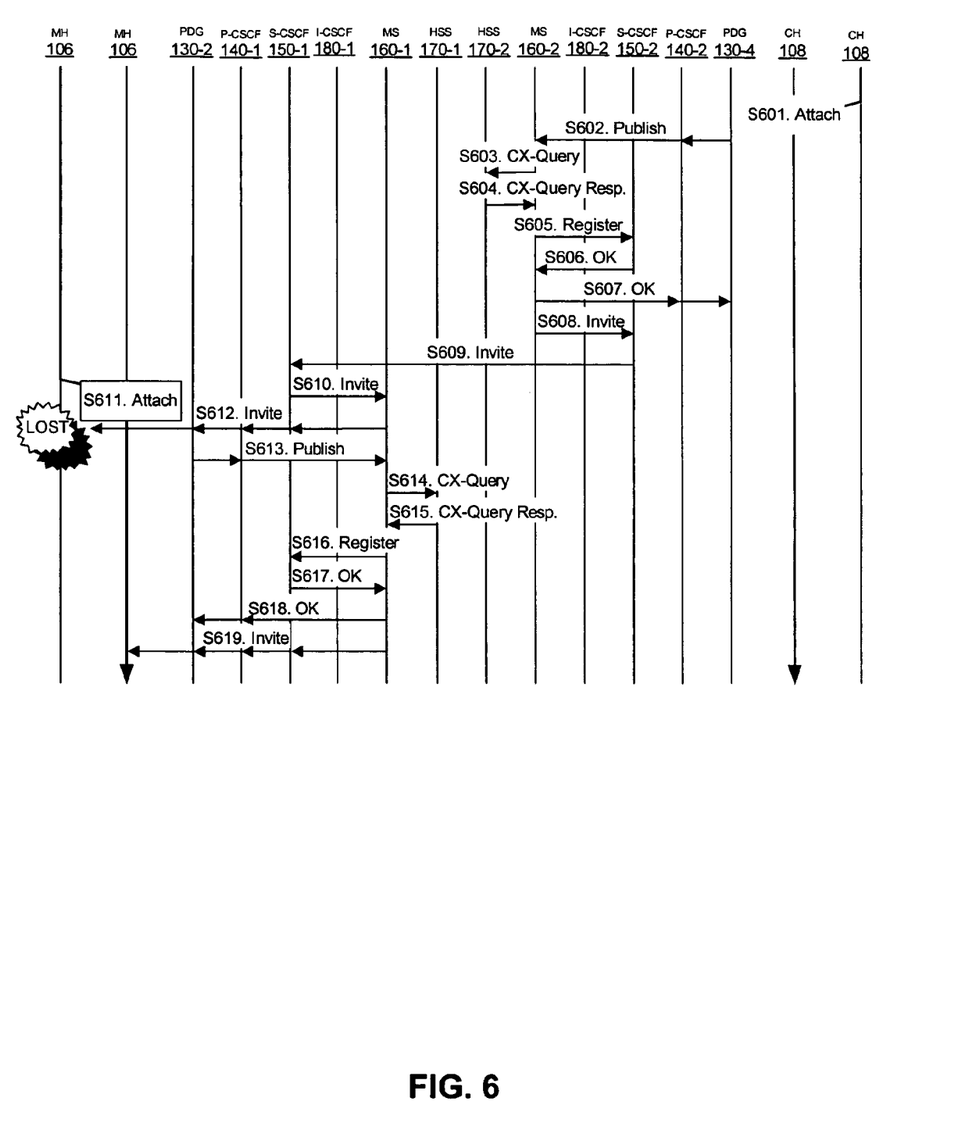
FIG. 6 illustrates an exemplary sequence diagram of another establishment process consistent with the present invention.

Under certain circumstances, both MH 106 and CH 108 may roam into different WLANs resulting new tunnel establishment with different PDGs at approximately the same time, which may create so-called simultaneous mobility. MS 160-1 and MS 160-2 may be used to manage such simultaneous mobility. FIG. 6 shows an exemplary sequence diagram of an establishment/re-establishment process for simultaneous mobility.

As shown in FIG. 6, and also with reference to FIG. 1, CH 108 may roam out of WLAN 110-3 into WLAN 110-4. As explained above, MS 160-2 may complete a registration process with S-CSCF 150-2 to handle the mobility of CH 108. For example, CH 108 may try to attach to WLAN 110-4 and to establish a tunnel with PDG 130-4 to continue communicating with MH 106 (step S601), and PDG 130-4 may receive indication of such attachment and tunnel establishment, such as shown in the state model explained above. For example, PDG 130-4 may change the state of CH 108 from "Idle" 402 to "Change of position" 410 and to "E2E tunnel established" 406.

A change in the state of an E2E tunnel corresponding to CH 108 and E2E tunnel establishment detection point 436 may be used to trigger PDG 130-4 to send a SIP publish message to MS 160-2 (step S602). After receiving the publish message, MS 160-2 may send a CX-Query message to HSS 170-2 based on the information from the publish message to obtain subscriber information of CH 108 from HSS 170-2 (step S603). HSS 170-2 may then search subscriber databases and/or other databases to obtain information required by the CX-Query message and may reply to MS 160-2 by sending a CX-Query response message to MS 160-2 (Step S604).

MS 160-2 may register CH 108 with S-CSCF 150-2 such that S-CSCF 150-2 may provide services for CH 108 (step S605). S-CSCF 150-2 may send back an acknowledge message to MS 160-2 to indicate that the registration is completed (step S606). MS 160-2 may also send back acknowledge messages to PDG 130-4 and/or P-CSCF 140-2 for indicating the completion of the registration and publication (step S607).

Further, MS 160-2 may start the establishment/re-establishment process between CH 108 and MH 106 using, for example, the 3PCC procedures as previously explained. MS 160-2 may send a SIP "Invite" message to S-CSCF 150-2 (step S608). After receiving the SIP "Invite" message from MS 160-2, S-CSCF 150-2 may forward the SIP "Invite" message to corresponding S-CSCF 150-1 to request for the call session establishment (step S609). S-CSCF 150-1 may in turn forward the SIP "Invite" message to MS 160-1 to request for the call session establishment (step S610).

After receiving the SIP "Invite" message from S-CSCF 150-1, MS 160-1 may forward the SIP "Invite" message to MH 106 to notify the request for a call session establishment with CH 108 (step S612). However, before MS 160-1 can send the SIP "Invite" message to MH 106, MH 106 may roam into WLAN 110-2 from WLAN 110-1. MH 106 may be unable to receive the SIP "Invite" message from MS 160-1. The SIP "Invite" message from MS 160-1 may be un-acknowledged by MH 106, because the message is sent to MH 106's previous address. MS 160-1 may keep the un-acknowledged, or un-delivered, SIP "Invite" message in a buffer memory or other media (e.g., RAM 204, Storage 216, or Database 214, etc.).

On the other hand, MH 106 may try to attach to WLAN 110-2 and to establish a tunnel with PDG 130-2 (step S611), as previously explained and PDG 130-2 may be triggered to send a SIP publish message to MS 160-1 (step S613). After the publish message is received by MS 160-1, MS 160-1 may complete the registration process by sending a CX-Query message to HSS 170-1 (step S614), receiving a CX-Query response message from HSS 170-1 (step S615), sending a registration message to S-CSCF 150-1 (step S616), receiving an acknowledge message from S-CSCF 150-1, and sending acknowledge messages to PDG 130-2 through P-CSCF 140-1 for indicating the completion of the registration and publication (step S618).

After MS 160-1 determines that the registration process is successfully completed, MS 160-1 may resend the un-acknowledged SIP "Invite" message that has been stored in the buffer memory to MH 106 (step S619). After MH 106 receives the SIP "Invite" message, MH 106 may establish the call session between MH 106 and CH 108 as explained above regarding FIG. 5. Problems caused by simultaneous mobility may be solved.

By using PDGs to detect mobility of mobile devices and using mobility servers to manage mobility of the mobile devices, computational burden on the mobile devices to monitor changes in addresses may be significantly reduced. Such network initiated triggering mechanism may also significantly increase the response speed of the network to handle mobility of the mobile devices. High-speed, real-time applications may thus be carried out more practically. In addition, extra modification or function may not be required in mobile devices. Further, by storing un-acknowledged SIP messages, simultaneous mobility may also be managed by using the mobility servers.

It is intended that the specification and examples be considered as exemplary only. Other embodiments of the invention will be apparent to those skilled in the art from consideration of the specification and practice of the invention disclosed herein.

What is claimed is:

1. A communication network for use in mobile communications, comprising:
    at least one mobile device configured to communicate with a corresponding host through a first wireless local area network of the communication network;
    a packet data gateway configured to detect an attachment of a mobile device of the at least one mobile device to a second wireless local area network controlled by the packet data gateway when the mobile device roams into the second wireless local area network from the first wireless local area network, and to allocate an 1P address to the mobile device; and
    a mobility server for establishing a call session between the mobile device and the corresponding host when the mobile device roams into the second wireless local area network from the first wireless local area network,
    wherein the mobility server manages the mobility for the mobile device and initiates the call session between the mobile device and the corresponding host, and
    wherein the packet data gateway is further configured to:
    monitor a state of a tunnel associated with the mobile device;
    determine the attachment by detecting a change of the monitored state of the tunnel associated with the mobile device; and
    notify the attachment to the mobility server.

2. The communication network according to claim 1, wherein the state of the tunnel associated with the mobile device includes one of idle, end-to-end (E2E) tunnel setup, E2E tunnel established, change of position, and exception.

3. The communication network according to claim 2, wherein, to determine the attachment, the packet data gateway is further configured to:
    determine the attachment by detecting the change of the state from the idle state to the E2E tunnel established state via the change of position state.

4. The communication network according to claim 1, wherein, to notify the attachment, the packet data gateway is further configured to:
    compose a SIP message indicative of the attachment; and
    send the SIP message to the mobility server.

5. The communication network according to claim 4, wherein the mobility server is further configured to:
    receive the SIP message from the packet data gateway; and
    establish the call session between the mobile device and the corresponding host using a third party call control (3PCC) process.

6. The communication network according to claim 5, wherein the mobility server is further configured to:
    store an undelivered SIP message in a buffer memory; and
    send the stored SIP message to the mobile device after receiving, from the packet data gateway, a subsequent SIP message indicating a new attachment of the mobile device.

7. The communication network according to claim 1, further comprising:
    a system acting as a serving call session control function configured to provide a communication path between the packet data gateway and the mobility server.

8. A method for use in performing mobile communications in a communication network, comprising:
    attaching, by a mobile device configured to communicate with a corresponding host through a first wireless local area network of the communication network, to a second wireless local area network controlled by a packet data gateway;

detecting, by the packet data gateway, the attachment of the mobile device;

allocating, by the packet data gateway, an IP address to the mobile device;

triggering, by the packet data gateway, a mobility server;

establishing, by the mobility server, a call session between the mobile device and the corresponding host when the mobile device roams into the second wireless local area network from the first wireless local area network; and initiating, by the mobility server, the call session between the mobile device and the corresponding host to manage the mobility for the mobile device;

wherein the triggering includes:

monitoring a state of a tunnel associated with the mobile device;

determining the attachment by detecting a change of the monitored state of the tunnel associated with the mobile device; and triggering the mobility server by sending a publish message indicative of the attachment to the mobility server.

9. The method according to claim 8, wherein the state of the tunnel associated with the mobile device includes one of idle, end-to-end (E2E) tunnel setup, E2E tunnel established, change of position, and exception.

10. The method according to claim 9, wherein the determining further includes:

determining the attachment by detecting the change of the state from the idle state to the E2E tunnel established state via the change of position state.

11. The method according to claim 8, wherein triggering further includes:

composing a SIP message indicative of the attachment; and
sending the composed SIP message to the mobility server.

12. The method according to claim 8, wherein establishing further includes:

receiving the composed SIP message from the packet data gateway; and establishing the call session between the mobile device and the corresponding host using a third party call control (3PCC) process.

13. The method according to claim 12, further including:

storing an undelivered SIP message in a buffer memory; and
sending the stored SIP message to the mobile device after receiving, from the packet data gateway, a subsequent SIP message indicating a new attachment of the mobile device.

14. The method according to claim 8, further including:

providing, by a system acting as a serving call session control function (S-CSCF), a communication path between the packet data gateway and the mobility server.

15. A mobility server for use in a communication network in which a mobile device communicates with a corresponding host through a first wireless local area network, the mobility server comprising:

a processor configured to:

receive an SIP message from a packet data gateway indicative of an attachment of the mobile device to a second wireless local area network controlled by the packet data gateway when the mobile device roams into the second wireless local area network from the first wireless local area network; and establish a call session between the mobile device and the corresponding host using a third party call control (3PCC) process in which the processor is configured to initiate the call session between the mobile device and the corresponding host to manage the mobility for the mobile device, wherein the packet data gateway allocates an IP address to the mobile device, monitors a state of a tunnel associated with the mobile device, determines the attachment by detecting a change of the monitored state of the tunnel associated with the mobile device, and notifies the attachment to the mobility server.

16. The mobility server according to claim 15, wherein the processor is further configured to:

store an undelivered SIP message in a buffer memory; and
send the stored SIP message to the mobile device after receiving, from the packet data gateway, a subsequent SIP message indicating a new attachment of the mobile device.

17. A packet data gateway for use in a communication network in which a mobile device communicates with a corresponding host through a first wireless local area network, the packet data gateway comprising:

a processor configured to:

allocate an IP address to the mobile device;

monitor a state of a tunnel associated with the mobile device;

determine, by detecting a change of the monitored state of the tunnel associated with the mobile device, an attachment of the mobile device to a second wireless local area network controlled by the packet data gateway when the mobile device roams into the second wireless local area network from the first wireless local area network; and notify the attachment to a mobility server to initiate a call session between the mobile device and the corresponding host to manage the mobility for the mobile device.

18. The packet data gateway according to claim 17, wherein the state of the tunnel associated with the mobile device includes one of idle, end-to-end (E2E) tunnel setup, E2E tunnel established, and change of position.

19. The packet data gateway according to claim 18, wherein, to determine the attachment, the processor is further configured to:

determine the attachment by detecting the change of the state from the idle state to the E2E tunnel established state via the change of position state.

20. The packet data gateway according to claim 17, wherein, to notify the attachment, the processor is further configured to:

compose a SIP message indicative of the attachment; and
send the composed SIP message to the mobility server.

* * * * *